J. M. WORTH.
TRACTION MECHANISM.
APPLICATION FILED MAR. 8, 1919.
1,390,324. Patented Sept. 13, 1921.
2 SHEETS—SHEET 2.
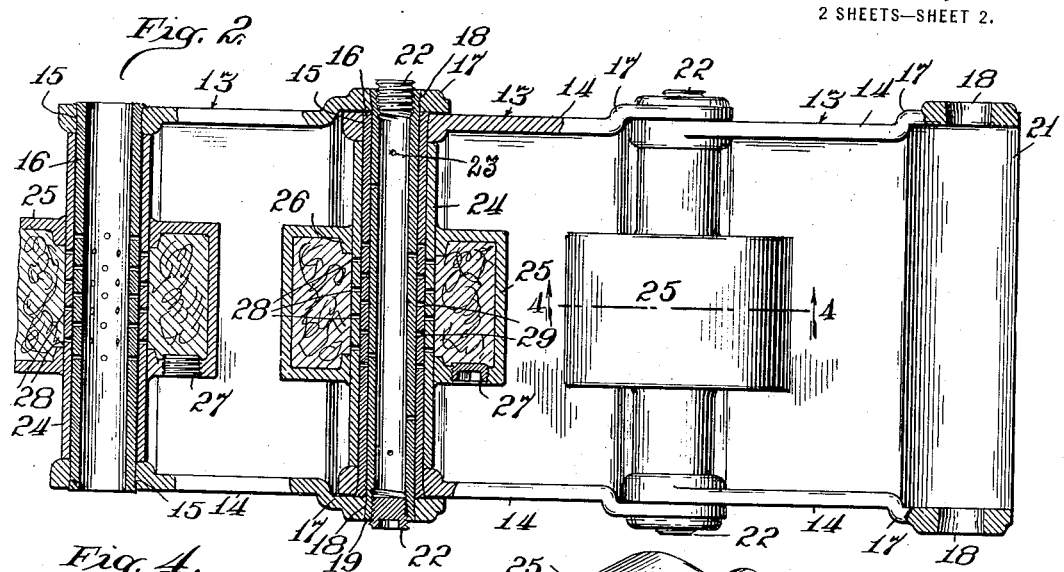
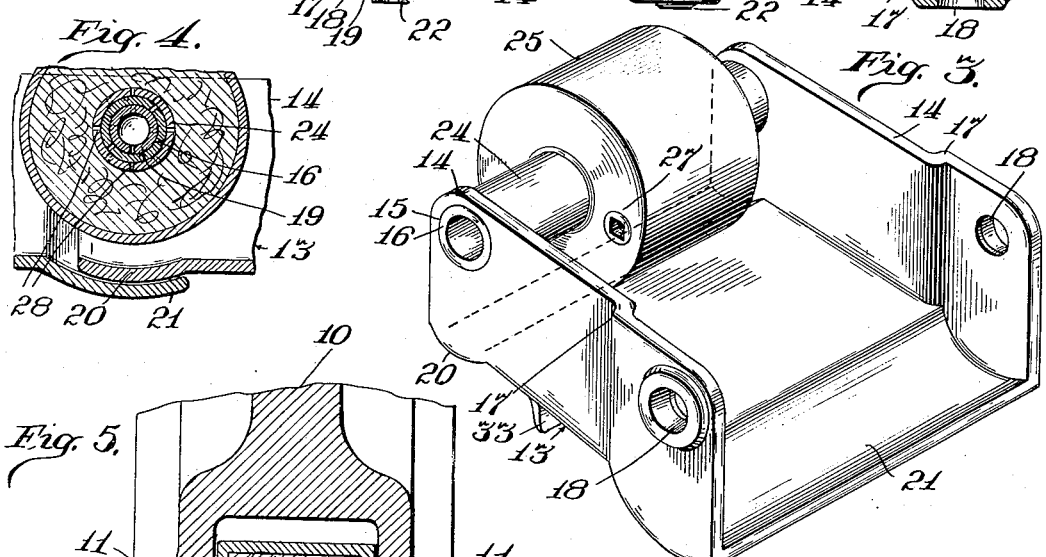
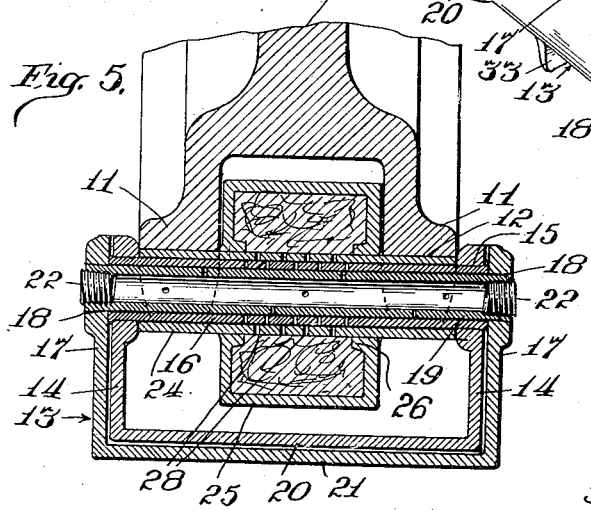
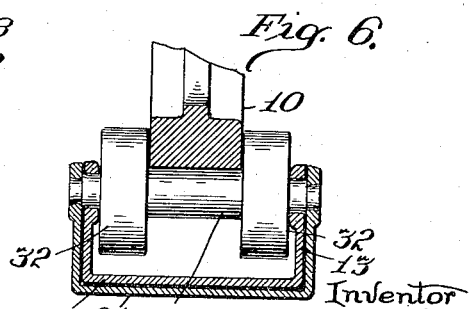
Witnesses
Milton Lenoir
F. A. Morell
Inventor
James M. Worth,
By Heidman Street
Attorneys

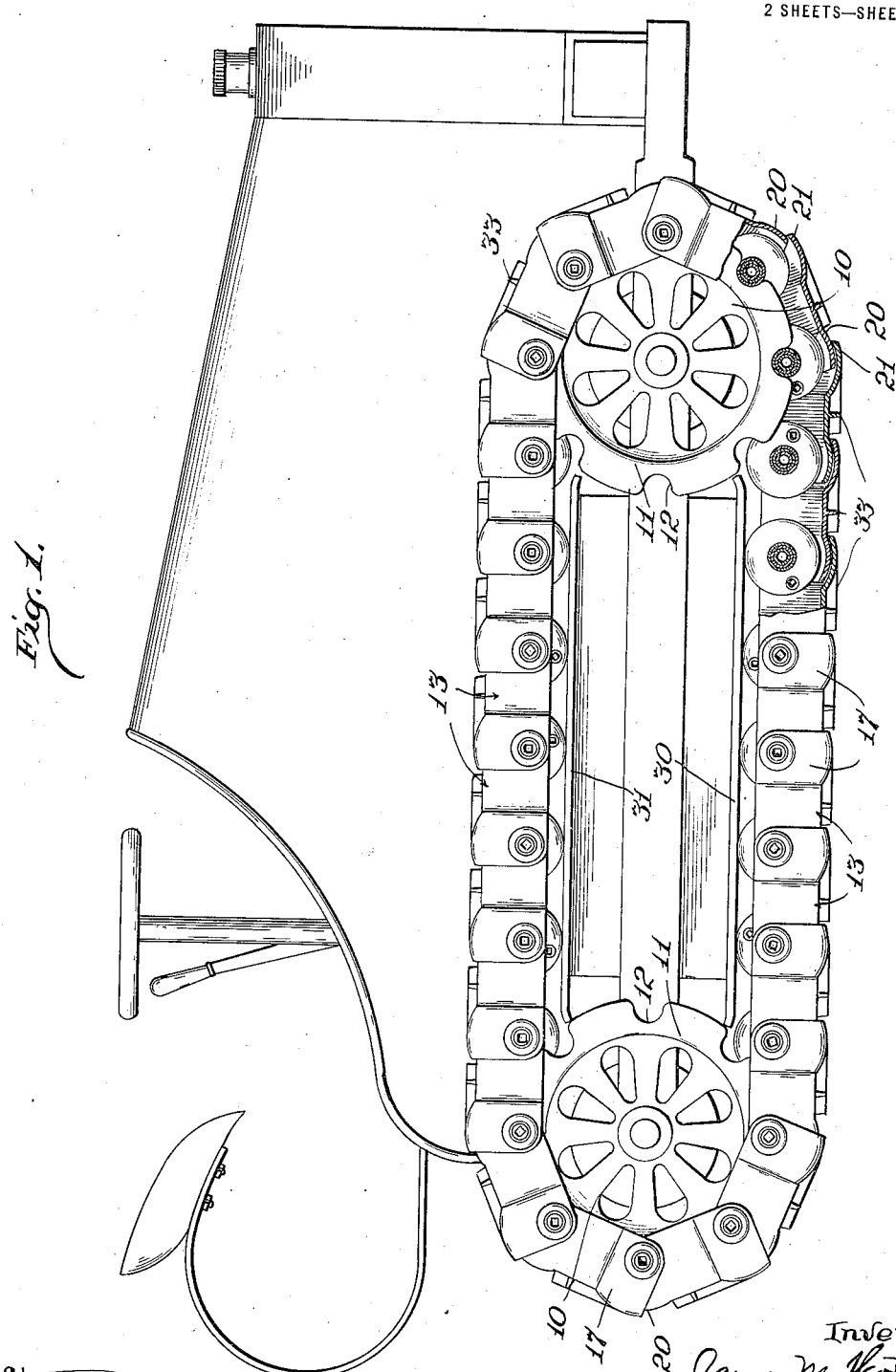

UNITED STATES PATENT OFFICE.

JAMES M. WORTH, OF CHICAGO, ILLINOIS.

TRACTION MECHANISM.

1,390,324.  Specification of Letters Patent.  Patented Sept. 13, 1921.

Application filed March 8, 1919. Serial No. 281,559.

*To all whom it may concern:*

Be it known that I, JAMES M. WORTH, a citizen of the United States, and a resident of Chicago, in the county of Cook and State of Illinois, have invented certain new and useful Improvements in Traction Mechanism, of which the following is a description, reference being had to the accompanying drawings, which form a part of my specification.

My invention relates to traction mechanism intended for use with tractors and the like, having for its object the provision of an endless element composed of a series of units or shoes which are pivotally connected together so as to permit the endless element to travel about the wheels whereby power is transmitted to the element.

One object of my invention is to provide a mechanism of the class referred to wherein the respective units or shoes may be stamped out of suitable sheet metal and thereby materially reducing the cost of production.

Another object of my invention is to provide means whereby the pivotal connections between adjacent units or shoes are of such construction that the same will be constantly lubricated and the endless element thereby made easy and smooth running; this feature of my invention being accomplished by means of a lubricant-holding member which is so related to the pivotal connections between the shoes or units as to provide a suitable anti-friction bearing with a suitable track or run-way formed on the underframe of the tractor and thereby rigidly maintaining the units or shoes against any upward flexing or movement at points intermediate of the wheel centers or axles.

The construction as disclosed in the drawings I believe to be the simplest and best adaptation of my invention, although it will be understood that the invention may have expression in somewhat different mechanical form without, however, departing from the spirit of the invention, as is evidenced by the modification disclosed.

The above enumerated purposes and advantages will be more readily comprehended from the following detailed description of the drawings, wherein:—

Figure 1 is a side elevation of a tractor provided with my improved traction mechanism.

Fig. 2 is a top plan view, partly in section, of a number of units comprising the traction mechanism or endless element.

Fig. 3 is a perspective view of one of the units or shoes.

Fig. 4 is a detail sectional view taken substantially on the line 4—4 of Fig. 2.

Fig. 5 is a detail cross-sectional view of a portion of one of the wheels and a shoe, illustrating the relation of the shoes of the endless element to the felly of the wheel, as well as the construction of the latter.

Fig. 6 is a similar view illustrating a modified form.

In the particular form of the invention as illustrated in Figs. 1 to 5, I show the endless element or belt passing about the wheels 10, 10; both of which are of similar construction and preferably provided with a bifurcated felly, as shown at 11, 11 in Fig. 5, so as to provide an intervening space or circumferential groove disposed about the felly of each wheel; said circumferential groove being of width and depth adapted to receive a portion of the endless element later described. The wheels 10 may, of course, be formed of disks spaced apart instead of a bifurcated felly; the spacing of the disks being equal to the width of the circumferential groove previously referred to. The fellies of the wheels are also provided at predetermined distances apart with transversely disposed grooves as shown at 12, see Fig. 1; the grooves being of dimensions and spacings commensurate with the pivotal connections and distances between the pivotal connections of adjacent shoes or units.

The traction element or endless belt comprises a suitable number of shoes or units 13 which are preferably provided with upstanding sides 14, 14, more clearly shown in Fig. 3. The sides 14, 14 at one of the ends of each shoe are provided with apertures as at 15 adapted to receive a tubular connecting member 16 extending from side to side of the shoe, as more clearly shown in Fig. 2; the tubular member 16 being suitably secured in the apertures 15, preferably against rotation.

The opposite end of the shoe has the sides 14, 14 preferably slightly offset, as shown at 17, 17 so as to adapt this end of each shoe to receive the opposite end of an adjacent shoe which corresponds to the ends provided with the apertures 15.

Instead of offsetting the sides 17, 17 as shown in Fig. 3, it is apparent that the overlapping relation between the ends of adjacent shoes may be accomplished by sufficiently spreading the sides 14, 14 apart at one end of each shoe and thereby accomplishing the same result as is accomplished by offsetting the ends, as shown at 17.

The off-set ends are apertured, as shown at 18, so as to receive a connecting pin or tube 19 preferably of the construction shown in Fig. 2; the tubular pin or connecting member being adapted to pass through apertures 18 and tubular member 16 which is secured intermediate of the sides 14, 14 at one end of an adjacent shoe or unit.

The ends of each shoe 13, on the ground-engaging portion or bottom thereof, are preferably made arcuate or downwardly curved as shown at 20 and 21, see Fig. 4; the arcuate portion 20 at one end of each shoe describing the arc of a smaller circle than the arcuate portion 21 at the opposite end of each shoe, so as to enable the arcuate end 20 to form overlapping relation with and come within the arcuate portion 21 of the adjacent shoe; the arcuate extensions or portions 20 and 21 being of such dimensions as to be in constant overlapping relation when the endless element is passing about the wheels 10, 10.

The connecting pin or tubular member 19, after being inserted into place, preferably has its ends closed by means of suitable screw-plugs or members 22, 22, which may be tapered as shown so as to cause the ends of the tubular connecting pin to become spread and thereby hold the connecting pin or tubular member 19 against removal; it being understood, of course, that the apertures 18 in the off-set ends of the shoes are made slightly larger than the normal diameter of the pin 19 in order to permit such spreading action. Instead of employing the tubular member 19, this member may be in the nature of a solid pin or bolt. When desired, the tubular connecting pin 19 may be filled with a suitable lubricant before the plugs or closure means 22 are inserted into place; and when the tubular member is so charged, it is preferably provided with a number of apertures as shown at 23 which will permit the lubricant to find its way intermediate of connecting pin 19 and tubular member 16.

Before tubular member 16 is permanently secured in the apertures 15 at one of the ends of each shoe, it is provided with a sleeve 24 which is loosely mounted on tubular member 16 and extends from side to side of the shoe intermediate of the upstanding sides 14. Secured to the sleeve 24, in any suitable manner so as to rotate therewith, is a cylindrical housing or hollow wheel 25, preferably of a diameter sufficient to enable the perimeter of the housing to extend slightly above the upstanding sides 14, 14, as shown in Fig. 1. In order to provide sufficient bearing, I show the cylindrical housing provided with a hub portion 26 on the interior thereof; the housing 25 being "sweated" or welded on to sleeve 24. The cylindrical housing 25, preferably before it is secured on the sleeve, is intended to be filled with waste material adapted to be saturated with a lubricant; or it may be filled with any suitable type of semi-solid lubricant. The side wall of the cylindrical housing, at a convenient point, is shown provided with an aperture closed by means of screw-plug 27, whereby oil or lubricant may be inserted into the housing. The loosely mounted sleeve 24, at points within the housing 25, is provided with a suitable number of apertures, as at 28, whereby the lubricant may pass through to the tubular connecting member 16; which latter in turn is also provided with a series of apertures as at 29 so as to permit the lubricant from the housing 25 to also find its way between tubular member 16 and the connecting pin 19.

With this construction it is evident that the pivotal connections between the respective shoes will be thoroughly lubricated, and such lubricated condition at the same time maintaining for a considerable period without recharging.

In addition to the function of lubricating the pivotal connections between the shoes, the lubricant-holding cylinders or housings 25 are also intended to provide an anti-friction bearing for the endless element on a suitable track or run-way 30 secured to the underframe of the tractor in any suitable manner at a point intermediate of the wheels 10, 10, see Fig. 1. If desired, a similar track may be provided above at 31 to support the endless element intermediate of the wheels in its forward travel across the top of the wheels as shown. The track 30 is so placed that the cylindrical housing 25, of the successive shoes or units, as they pass about the wheels, will be in contact therewith and thereby maintain the endless element against any upward pressure or flexing at points intermediate of the wheels 10, 10; the cylindrical housings 25 of each unit or shoe being free to roll along the track 30 during travel of the endless element.

Instead of employing a single cylindrical lubricant-holding housing or roller 25, a pair of smaller housings may be mounted on each sleeve 24 adjacent the ends thereof, as shown in Fig. 6, at 32; the construction and operation of the modified form being similar to that previously described.

In order to permit the endless element to travel about the wheels 10, 10, it is evident that the fellies of the wheels must be so constructed as to provide a sufficient groove or opening to receive the cylindrical housings, especially where a single cylindrical lubricant-holding housing is employed, as shown in Fig. 5. Where a pair of cylindrical housing are employed and arranged adjacent to the ends of the sleeve 24, it is evident that the felly of the wheel need merely contact with the sleeve 24 intermediate of the respective housings 32.

The construction shown and described will enable an endless element to be made out of stamped metal and a traction mechanism therefore more cheaply constructed than has heretofore been the case; while at the same time an endless element is provided which will be maintained absolutely rigid intermediate of the wheels and provide the desired traction as a result of the rigid truss formed by the rotating lubricant-holding members moving along a rigid track. The arcuate overlapping ends 20 and 21 of adjacent shoes will constantly bridge the gap that otherwise would occur between adjacent shoes and will therefore obviate the possibilities of stones or other hard substances becoming wedged between the approaching ends of adjacent shoes or units while the same are passing downward about the forward wheels.

The bottoms of the shoes or units may be provided with any suitable formation or ground-gripping surfaces or ribs, preferably disposed transversely of the shoes, as shown for example at 33.

Having thus shown and described my invention, what I wish to claim by Letters Patent is:

1. Traction mechanism, comprising an endless tractor element composed of a plurality of shoes or units having vertically disposed sides, the sides at one end of each shoe being spaced farther apart than the sides at the opposite end of the shoe so as to receive the end of an adjacent shoe therebetween, means whereby the adjacent ends of the shoes are pivotally connected together, lubricant-holding means rotatably mounted on said first mentioned means, and a stationary track or run-way along which the rotatably mounted means is adapted to travel and the endless element held against flexing.

2. Traction mechanism, comprising an endless tractor element composed of a plurality of shoes or units having vertically disposed sides, with the sides at one end of each shoe being spaced farther apart than the sides at the other end, so as to adapt the enlarged end to receive the sides of an adjacent shoe, the ground-engaging portions at the ends of each shoe being made arcuate, with the arcuate portion at one end describing the arc of a larger circle than that described by the arcuate portion at the other end so as to adapt the ends of adjacent shoes to overlap, means whereby the ends of adjacent shoes are pivotally connected together, and lubricant-holding means rotatably mounted on the first mentioned means, said lubricant-holding means being adapted to roll along a track-way of the tractor underframe, and maintain the endless element against flexing.

3. Traction mechanism, comprising an endless element composed of a plurality of shoes or units having vertically disposed sides formed so as to permit the ends of the sides to have overlapping relation with the ends of the sides of adjacent shoes, the overlapping portions being apertured, means disposed through the registering apertures of adjacent shoes pivotally securing the shoes together, and lubricant-holding means rotatably secured on the first means for lubricating the pivotal connections and provide anti-friction bearing on the tractor-underframe intermediate of the wheels of the tractor.

4. Traction mechanism, comprising an endless element composed of a plurality of shoes having apertured lobes or extensions at each end of the shoes, the extensions at one end being spaced farther apart than the extensions at the opposite end, so that the latter end of an adjacent shoe may have overlapping relation with the first mentioned extensions, means disposed through the registering apertures of adjacent shoes for pivotally connecting the shoes together, and a cylindrical housing rotatably secured on said means and having communication therewith, said housing being adapted to hold lubricant so as to transmit it to the first means and also have rolling contact with the underframe of the vehicle intermediate of the wheels and thereby maintain the endless element against flexing.

5. Traction mechanism, comprising an endless element of a plurality of shoes or units, substantially U-shape in cross-section in a direction transversely of the element, the ends of the sides being apertured and formed at one end of each shoe so as to overlap the opposite end of an adjacent shoe, while the ground-engaging portion of each shoe at its ends is made arcuate, with the arcuate portion at one end describing a larger arc than the arcuate portion at the opposite end so as to permit the arcuate portions of adjacent ends of two shoes to overlap, means disposed through the registering apertures in the ends of adjacent shoes, for pivotally securing the shoes together, and a cylindrical housing rotatably secured on the means and in communication therewith, said housing being adapted to hold a lubricant and also provide rolling contact with the underframe of a vehicle and thereby maintain the element against flexing.

6. Traction mechanism, comprising an endless element composed of a plurality of shoes having perpendicularly disposed sides, one end of each shoe being of greater width than the opposite end so as to adapt said end to receive the narrower end of the adjacent shoe, the sides at their ends being apertured so as to permit the apertures of adjacent shoes to register, connecting means disposed through the registering apertures for pivotally securing the shoes together, and enlarged, hollow cylindrical housings disposed between the sides of the shoes and rotatable on said connecting means, said housings being adapted to hold lubricating material, the inner perimeters of the housings being apertured to permit the lubricant to pass therethrough and onto said connecting means, said housings being disposed above the sides of the shoes so as to roll on the underframe of the vehicle and provide anti-friction bearing for the shoes so as to prevent flexing of the element.

7. Traction mechanism, comprising an endless element composed of a plurality of shoes having vertically disposed sides, the sides at their ends being apertured, with one end of each shoe of greater width than the opposite end so as to permit the narrower end of one shoe to come within the wider end of an adjacent shoe, the apertures in the sides at one end of each shoe being provided with a tubular connecting member disposed from side to side, a pivot member disposed through said tubular member and the overlapping sides of an adjacent shoe whereby the shoes are pivotally secured together at the upper ends, a sleeve loosely mounted on the tubular member and extending from side to side of the shoes, and a cylindrical housing or drum secured to said sleeve so as to rotate therewith, the housing being adapted to contain lubricating material, said sleeve and tubular member being perforated so as to permit lubricant from the housing to pass intermediate of the sleeve and tubular member and intermediate of the tubular member and the pivot member; said housing being also adapted to have rolling contact with a track intermediate of the wheels of the vehicle and thereby hold the endless element against flexing.

8. Traction mechanism, comprising an endless tractor element composed of a plurality of shoes or units having vertically disposed sides, the sides at one end of each shoe being spaced farther apart than the sides at the opposite end of the shoe, to adapt said first mentioned end to receive the narrower end of an adjacent shoe therebetween, the bottom and vertically disposed sides comprising an integral, single piece shoe, the ends of the successive shoes being arranged to telescope with one another so as to provide a constant overlapping of adjacent shoe ends during the entire travel of the mechanism, a track or run-way, and means whereby the adjacent ends of the shoes are pivotally connected together, a portion of said means being adapted to travel rotatably on said track or run-way.

9. Traction mechanism, comprising an endless tractor element composed of a plurality of shoes or units, each formed of a single piece of metal and having vertically disposed sides, with the sides at one end of each shoe spaced farther apart than the sides at the opposite end, to adapt said first mentioned end of each shoe to receive the narrower end of an adjacent shoe therebetween so as to have the ends of adjacent shoes in constant overlapping relation throughout the travel of said element, means whereby the adjacent ends of the shoes are pivotally connected together, a track or run-way, and means rotatably mounted within the shoes adapted to travel on said track or run-way.

JAMES M. WORTH.

Witnesses:
G. HEIDMAN,
F. A. FLORELL.